Aug. 4, 1953

G. MEDIANO CAPDEVILA 2,647,281

AUTOMATIC MACHINE FOR VULCANIZING
RUBBER SOLES ON BOOTS AND SHOES

Filed Dec. 27, 1949

INVENTOR

G. Mediano Capdevila

BY Wenderoth, Lind & Ponack

ATTORNEYS

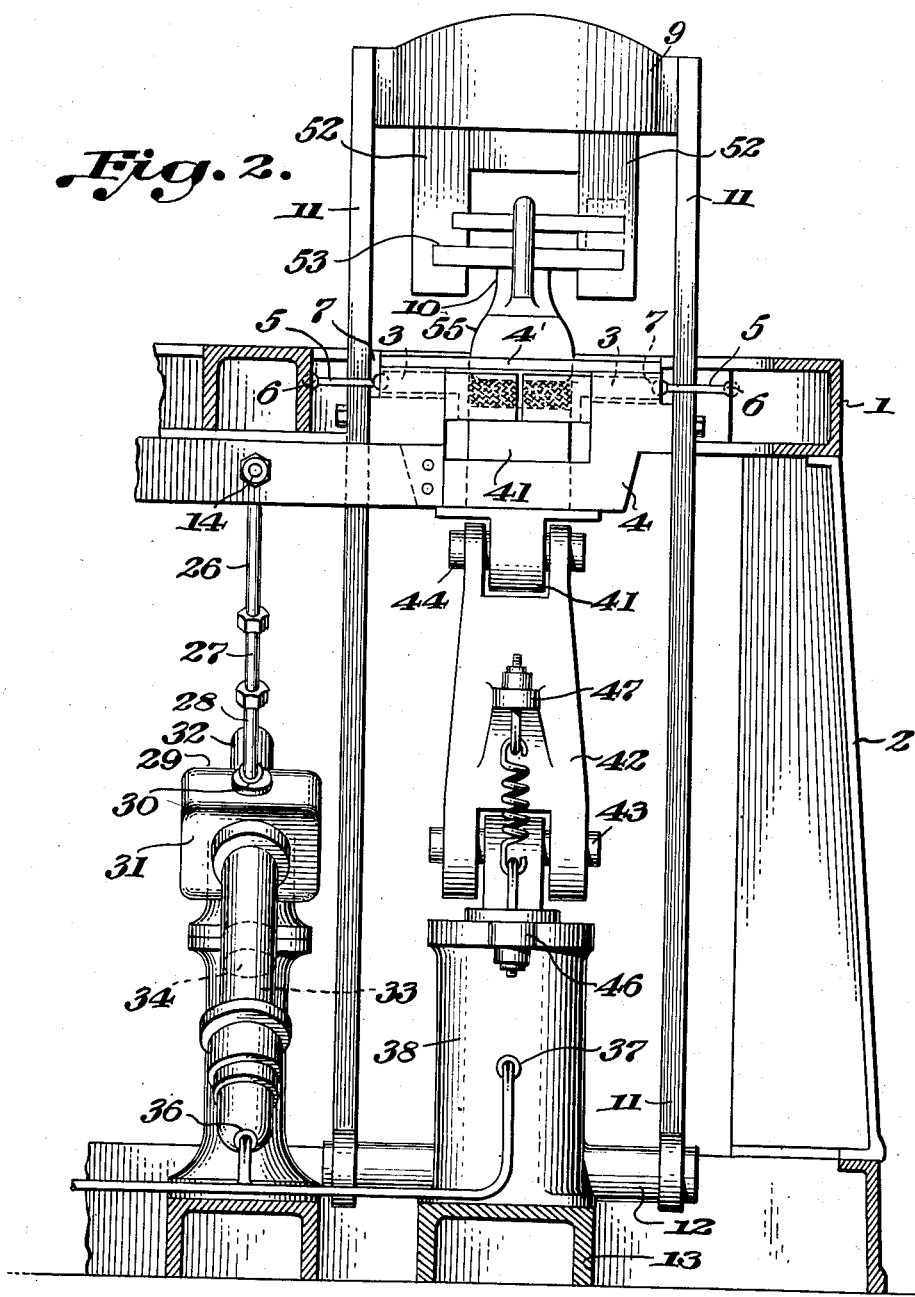

Aug. 4, 1953
G. MEDIANO CAPDEVILA
2,647,281
AUTOMATIC MACHINE FOR VULCANIZING
RUBBER SOLES ON BOOTS AND SHOES
Filed Dec. 27, 1949
8 Sheets-Sheet 3
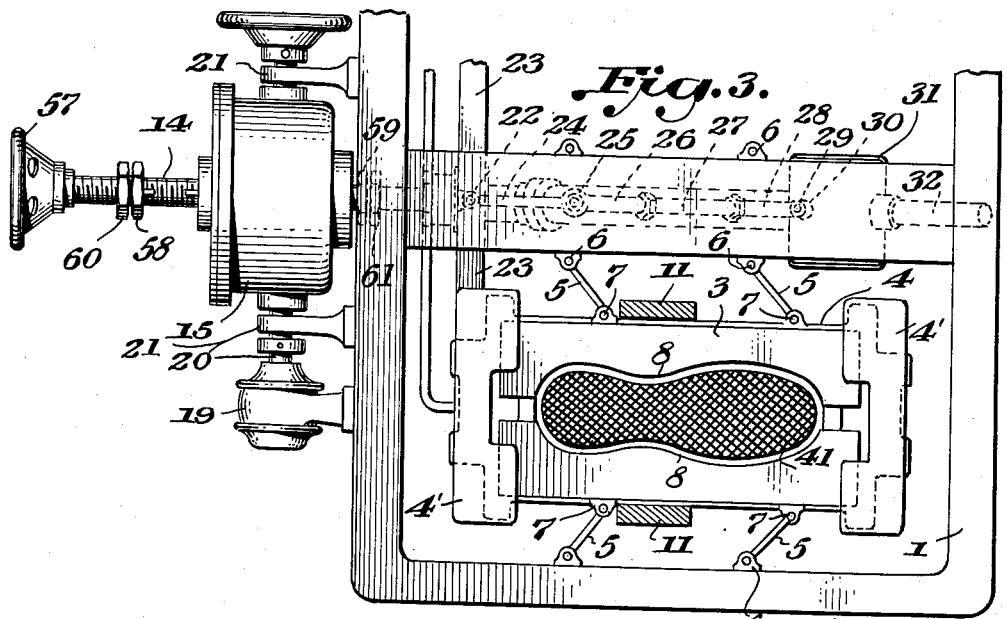
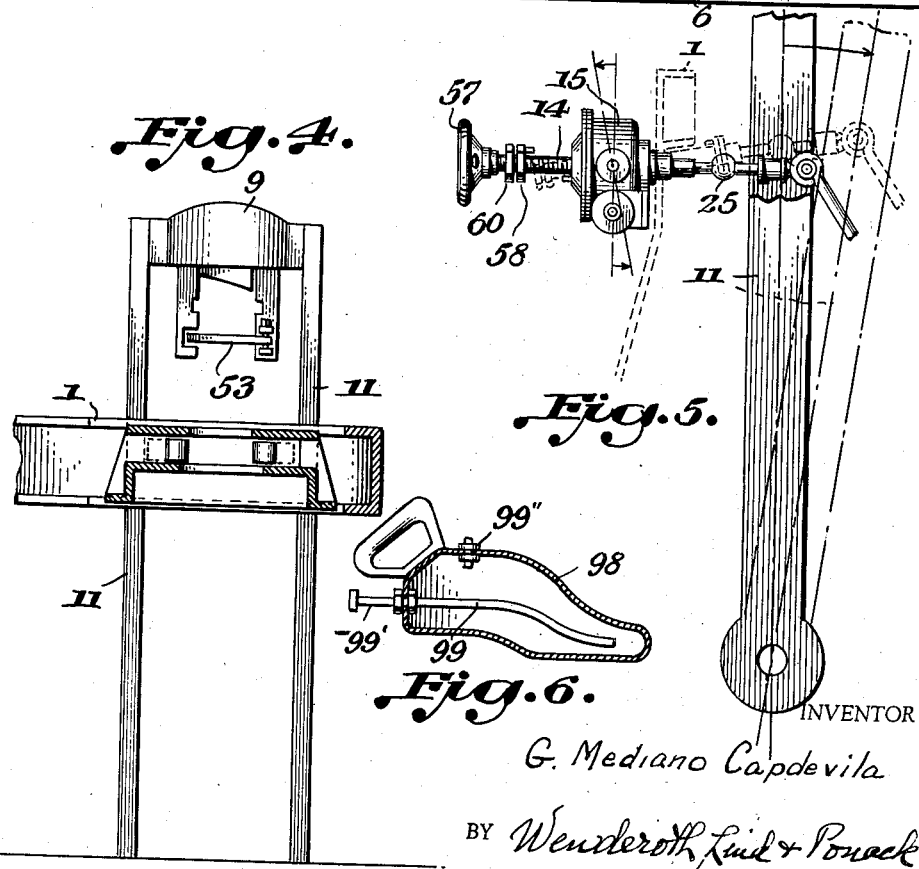
INVENTOR
G. Mediano Capdevila
BY Wenderoth, Lind & Ponack
ATTORNEYS Aug. 4, 1953
G. MEDIANO CAPDEVILA
2,647,281
AUTOMATIC MACHINE FOR VULCANIZING
RUBBER SOLES ON BOOTS AND SHOES
Filed Dec. 27, 1949
8 Sheets-Sheet 5
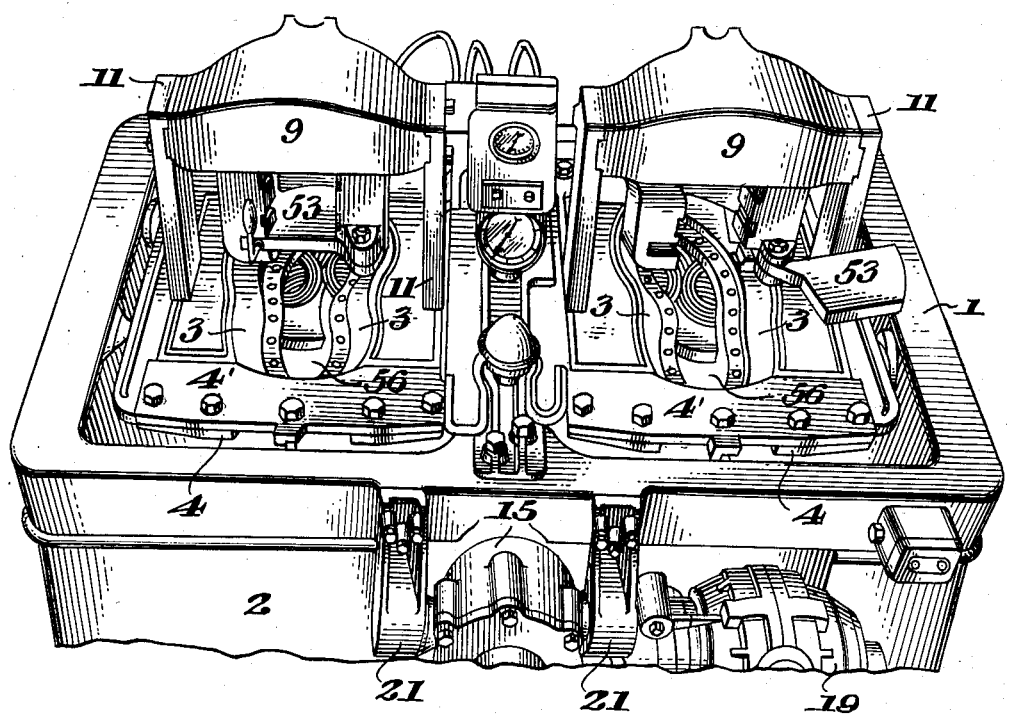
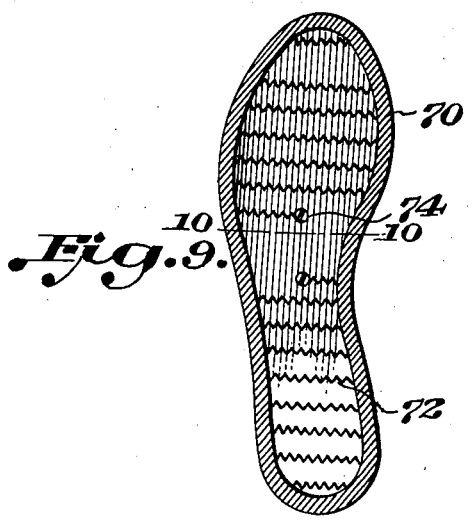
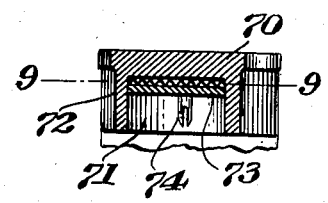
INVENTOR
G. Mediano Capdevila
BY Wenderoth, Lind & Ponack
ATTORNEYS

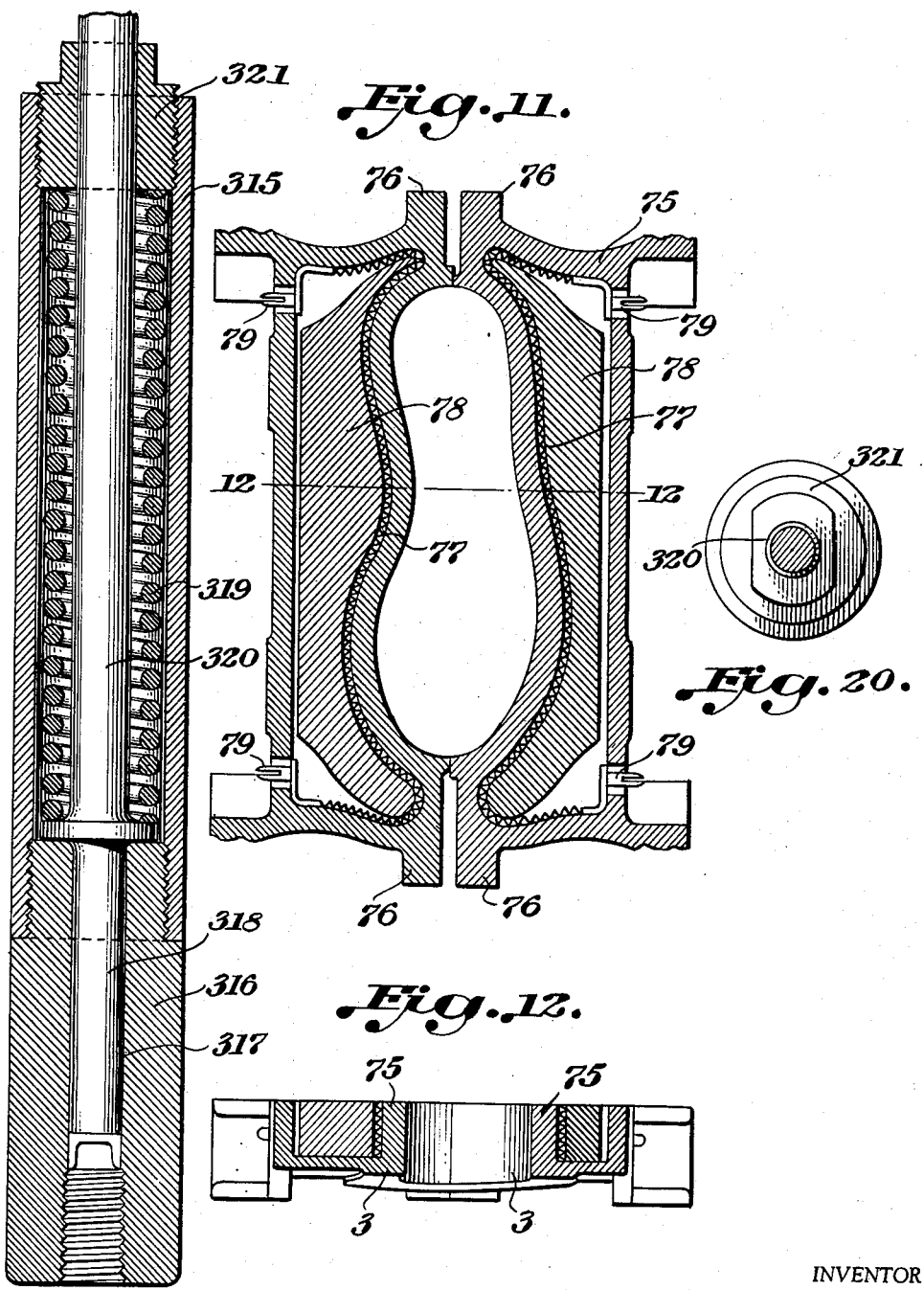

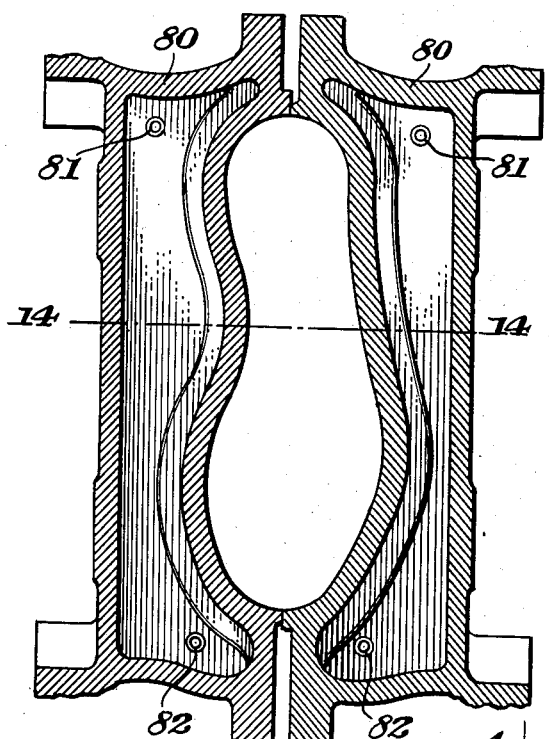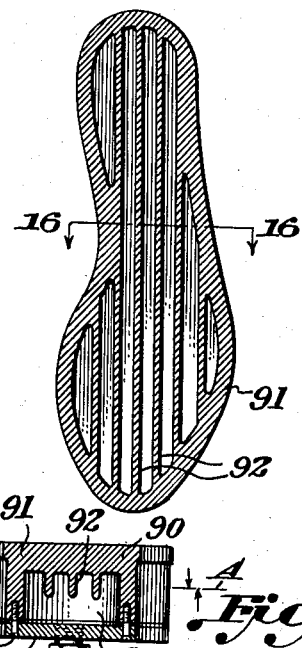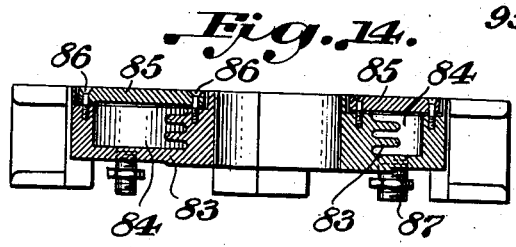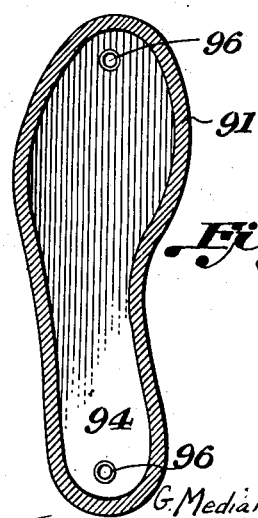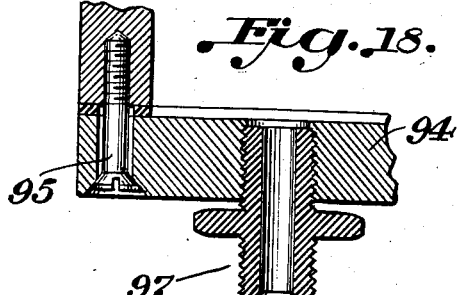

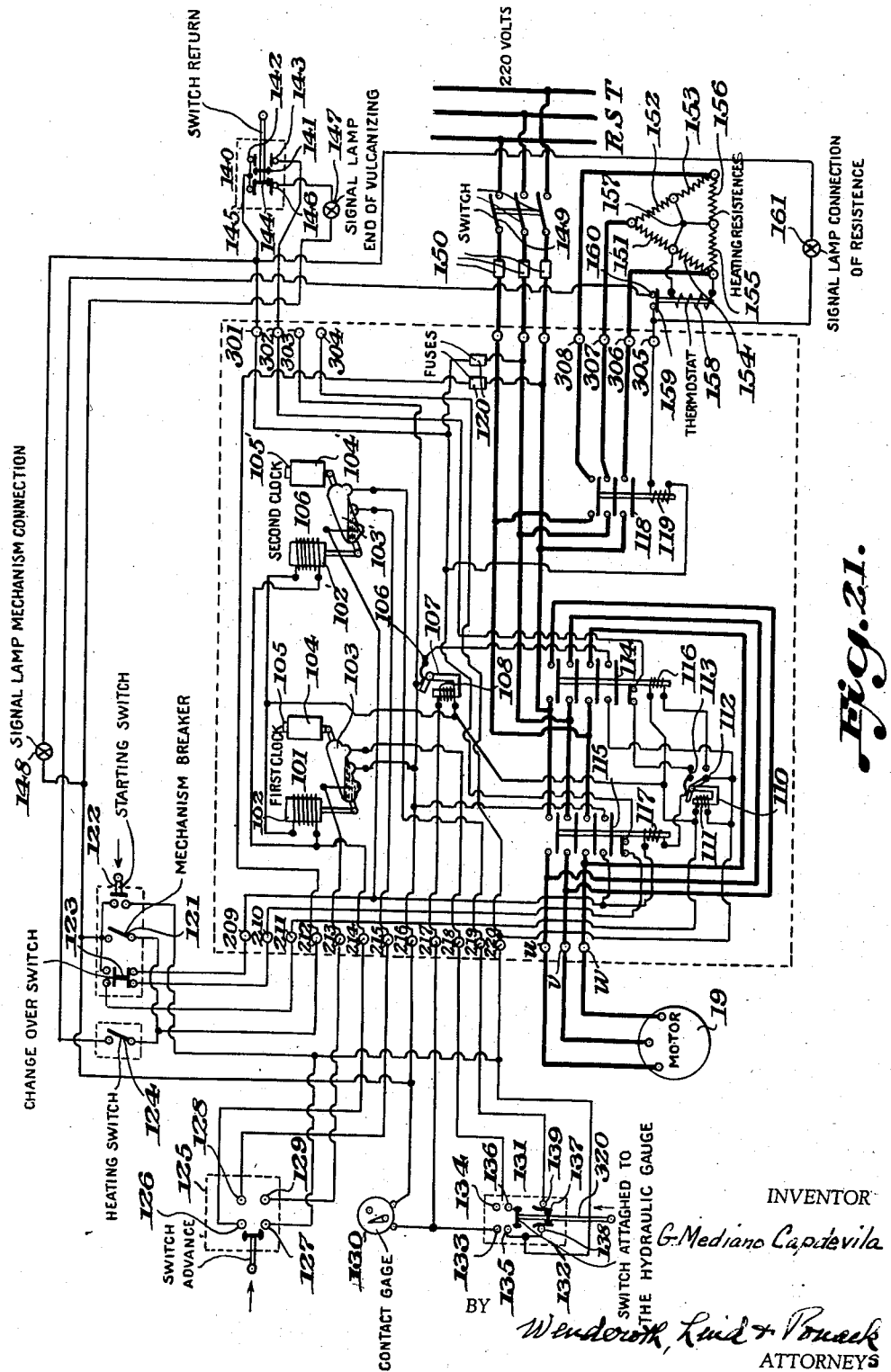

Patented Aug. 4, 1953

2,647,281

UNITED STATES PATENT OFFICE 2,647,281

AUTOMATIC MACHINE FOR VULCANIZING RUBBER SOLES ON BOOTS AND SHOES

Gonzalo Mediano Capdevila, Barcelona, Spain, assignor to Coturno, S. A., Caracas, Venezuela, a corporation of Venezuela Application December 27, 1949, Serial No. 135,246
In Spain March 30, 1946

12 Claims. (Cl. 18—17)

This application is a continuation-in-part of abandoned application Serial No. 684,670 filed July 19, 1946.

The present invention relates to shoe manufacture and is particularly directed to an automatic machine for uniting by vulcanization a rubber sole to the upper of a boot or shoe. The term sole may be construed to also include the heel.

An object of the invention is to provide a machine comprising a last and a mold consisting of three parts movable relatively to the last and constituted by a sole platform and a pair of jaws adapted to shape respectively the undersurface and the two side edges of the sole together with appropriate heating means.

An object of the invention is to provide an improved machine which operates automatically or largely automatically and which is especially suitable for use in uniting a rubber sole to a boot or shoe upper of material, such as leather, liable to be damaged by exposure to high temperature.

A further object of the invention is to provide a machine embodying two jaws which close upon the bottom edges of the boot or shoe upper and exert lateral compression thereagainst.

A further object of the invention is to provide a reciprocating sole platform upon which unvulcanized rubber is placed which is designed to be united to the boot or shoe upper.

A further object of the invention is to provide a period of immobility of the machine while the parts constituting the mold are exerting pressure during the vulcanization.

A still further object of the invention is to provide for the opening of certain jaws to release the boot or shoe and the descent of a platform upon completion of the vulcanization.

Another object of the invention is to provide for a proper sequence of the operations above outlined so that they can be performed automatically and the operator is only required to attend to the machine for the insertion of the parts of the boot or shoe preparatory to vulcanization and the extraction of the vulcanized boot or shoe from the machine. Consequently one operator can attend to several machine, since they effect all the operations necessary for uniting the sole to the upper by vulcanization in a predetermined interval of time.

A still further object of the invention is to provide means whereby suitable pressures for the different periods of vulcanization are automatically applied.

A still further object of the invention is to provide electrical controls for the operation of the machine so that after operation has been initiated the machine will automatically carry the vulcanization of the sole to the upper to completion while insuring that the material of the upper is not damaged by heat.

A still further object of the invention is to provide cooling means as desired to prevent any damage to the upper during the vulcanization step.

A more specific object of the invention is to provide a machine including a rigid frame, a rockable bridge comprising a head having on its under side means for the attachment of a last in an upright position, the bridge also comprising two depending arms pivotally connected at their lower ends to said frame, guides rigidly mounted on said bridge and supporting a pair of jaws which are adapted to shape the two side edges of the sole and which are slidable towards and away from each other in a direction perpendicular to the direction of rocking movement of the bridge, means cooperating with the jaws and the frame to urge the jaws together in response to rocking movement of the bridge, a platform which is adapted to shape the under side of the sole, the platform being provided with heating means and connected to an elevating device mounted in the frame, and actuating means serving first to displace the bridge so as to close the jaws and thereafter to operate the elevating device to raise the platform into position to compress the sole against the last. The means for urging the jaws together may constitute struts each pivotally connected to one of the jaws and to the frame.

In a preferred arrangement the said actuating means may include a screw-threaded shaft engaged in an internal screw thread in a hollow hub of a gear member rotatable but not axially displaceable in a gear box mounted on the said frame, and means for rotating the gear member in either direction, the shaft being pivotally connected to the bridge, and the arrangement being such that rotation of the gear member can cause axial displacement of the shaft without its rotation, whereby the bridge is rocked. This shaft may be provided with two clutch members disposed respectively on opposite sides of the hub of the gear member and adapted to engage complementary clutch members on this hub when the shaft reaches the respective limits of its range of axial displacement, whereby rotations in the two directions is imparted to the shaft on completion of its axial displacements. The actuating means may also include a shaft coupled by a universal joint to the said screwthreaded shaft and drivably connected to the elevating device.

The axial displacements of the shaft in the two directions correspond respectively to the stages of opening and closing of the jaws, and the rotary movement of the shaft, at the end of the axial displacement effecting the closing of the jaws, corresponds to the period in which the platform ascends and presses the rubber sole with different pressures against the upper on the last.

The actuating means preferably are adapted also to open the jaws and to lower the platform and cooperate with a timing device which introduces a predetermined delay between on the one hand the closing of the jaws and the raising of the platform and on the other hand the opening of the jaws and the lowering of the platform. Thus, where the actuating means include the axially displaceable and rotatable shaft hereinbefore referred to, the platform is maintained automatically in its molding position by the action of the timing device for as long as is required to ensure complete vulcanization of the rubber sole. As soon as vulcanization is complete, the gear member is set in rotation in the reverse direction with the result that first the shaft is displaced axially to cause the opening of the jaws and thereafter it is set in rotation to cause the descent of the platform. The operating mechanism of the platform may be operated by hydraulic or mechanical or electrical means.

With the above and other objects in view one embodiment of the invention, by way of example, is shown in the accompanying drawings in which:

Fig. 2 is a side view of the machine with parts omitted for greater clarity;

Fig. 3 is a plan view of one operating station.

Fig. 4 is an elevational view with certain parts in cross-section of certain elements of the machine with parts omitted illustrating the details thereof;

Fig. 5 is a side view of the control shaft together with a fragmentary view of the bridge supporting arms illustrating the two limit positions of such arms during the operation of the machine;

Fig. 6 is a cross-sectional view of a type of last which may be used;

Fig. 8 is a fragmentary perspective view of both operating stations;

Fig. 9 is a cross-sectional view taken upon section line 9—9 of Fig. 10 illustrating one type of heating means that may be used for the platform for applying the unvulcanized rubber against the bottom of the upper upon a last;

Fig. 10 is a cross-sectional view upon section line 10—10 of Fig. 9;

Fig. 11 is a horizontal cross-sectional view through a pair of cooperating jaws wherein electrical resistances are used for accomplishing the vulcanization;

Fig. 12 is a cross-sectional view taken upon section line 12—12 of Fig. 11;

Fig. 13 is a view similar to Fig. 11 but illustrating a modified construction of the jaws wherein water or steam is used for supplying the heat for vulcanization;

Fig. 14 is a cross-sectional view taken upon section line 14—14 of Fig. 13;

Fig. 15 is a cross-sectional view taken upon section line A—A of Fig. 16 looking upwardly in the direction of the arrows of a water or steam heated platform to be used in conjunction with the jaws shown in Fig. 13;

Fig. 16 is a cross-sectional view taken on the section line 16—16 of Fig. 15;

Fig. 17 is a cross-sectional view taken upon section line A—A of Fig. 16 looking downwardly in the direction of the arrows:

Fig. 18 illustrates a fragmentary cross-sectional view of a detail showing the type of coupling that may be used for the inlet of water or steam on an enlarged scale;

Fig. 19 is a cross-sectional view of a hydraulic gauge used in cooperation with electrical switches for controlling the pressure applied during different periods of vulcanization;

Fig. 20 is a top plan view of the gauge shown in Fig. 19; and

Fig. 21 is a wiring diagram for securing the proper sequential operation of the various elements of the machine.

In the various figures similar reference characters indicate like parts.

Figure 1:
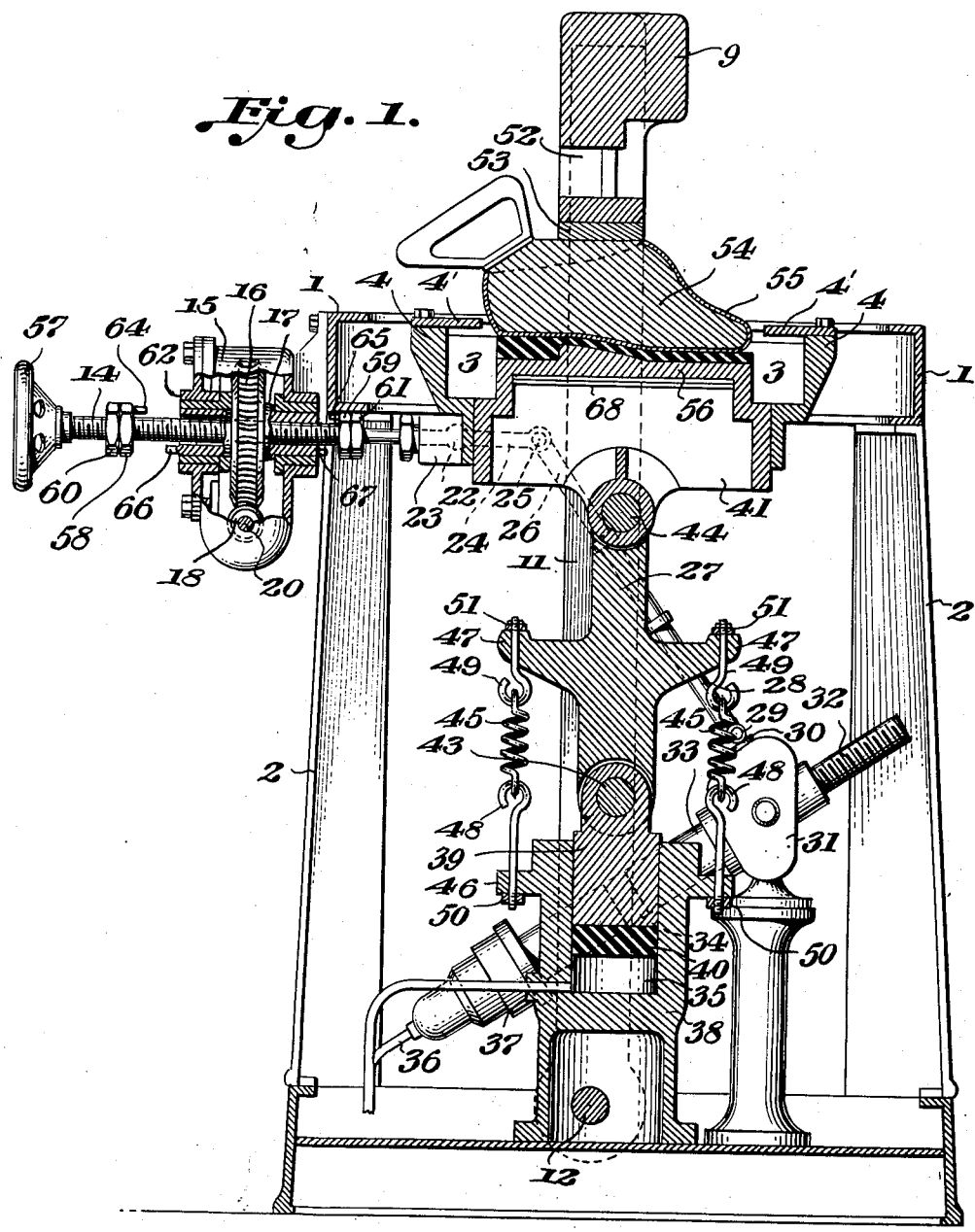
Fig. 1 is a cross-sectional view taken through one of the operational stations of the machine.
Figure 7:
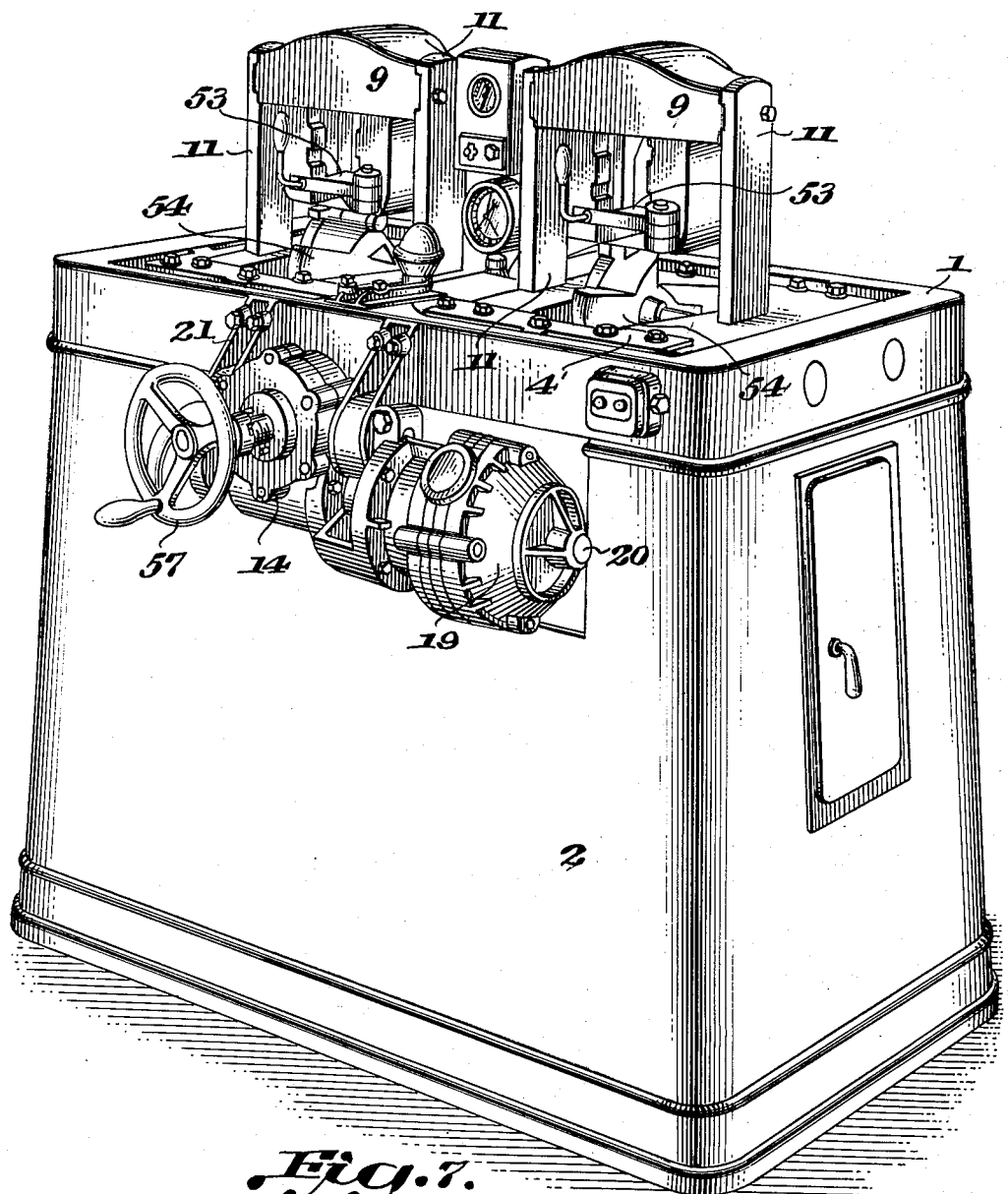
Fig. 7 is a perspective view of the entire machine illustrating the two operating stations.

The machine is adapted to vulcanize two shoes simultaneously as clearly appears from Figs. 7 and 8. In Figs. 1, 2 and 4 only one operating station is shown but the other station is exactly similar thereto.

Referring to Fig. 1 a fixed horizontal frame 1 is fixed to the stand 2. At each side of the machine the ends of a pair of jaws 3 are slidable in guide members consisting of a casting 4 and two head plates 4' fixed to the part 4 by screws. The jaws are connected to the sides of the frame 1 by means of struts 5 (Fig. 3), the ends of which are pivotally connected by means of pivoted joints 6 and 7 to the sides of the frame and of said jaws respectively. The jaws have their borders 8 so contoured as both to embrace the lower part of a shoe upper required to be united by vulcanization to a rubber sole and also to mold the edge of the sole.

The guide members 4 are fixed by screws to a rocking bridge comprising a head 9 and two depending arms 11. In the head 9 is provided a space 10 for the last. The two arms 11 are pivoted on pins 12 rigid with a base portion 13 of the frame.

At one side of the frame 1 is an actuating screw shaft 14 passing through a gear box 15 in which is mounted on journal and thrust bearings a worm wheel 16. A hub 17 of the wheel 16 is internally screw threaded and engages the shaft. A worm 18 cooperates with the worm wheel 16 and is connected by a shaft 20 to a reversible motor 19 attached to the frame of the machine (Fig. 3).

Bearings 21 supporting the worm shaft 20 are fixed to the side of the frame through which the shaft 14 passes. This shaft 14 has near its inner end a ball 22 (Figs. 1 and 3) connected by a universal housing to a beam 23 rigid with the guides 4. An extension 24 of the shaft 14 beyond the ball 22 ends in a universal joint 25 to which one end of a shaft 26 is connected. An intermediate sleeve 27 connects the shaft 26 to a shaft 28 constituting an extensible prolongation of the shaft 26, so that the length of the composite shaft 26, 27, 28 can be adjusted to suit the normal operation of the machine. The lower end of the shaft 28 is connected by a universal joint 29 to a projecting end 30 of a shaft in a gear box 31, in which a gear-wheel system is adapted to impart axial displacements in both directions to a screw 32 guided in a cylinder 33. A piston 34 operates in the cylinder 33 to cause the transfer of liquid between the cylinder 33 and two ram chambers, one at each side of the machine, formed in cylindrical bodies 38, only one of which appears in Fig. 2. A port 36 of the cylinder 33 is connected by a pipe with an admission and discharge port 37 in the bottom of each ram chamber 35. A piston 39 is slidable in the chamber 35 and provided with an elastic packing 40 sealing the piston with respect to the wall of the chamber 35. The piston 39 constitutes an actuating member for a platform 41 slidable in a direction parallel to the arms 11 in the guide 4. A strut 42 is connected by a gudgeon pin 43 with the piston 39 and by a gudgeon pin 44 with the base of the platform 41. Downward movement of the platform is assisted by helical tension springs 45 connected between brackets 46 extending from the body 38 and brackets 47 extending from the piston strut 42. The springs are anchored by hook bolts 48 and 49 which are held in the brackets by means of nuts 50 and 51 serving as tension adjusters.

The lower face of the bridge head 9 is provided with two lugs 52 having inwardly projecting shoulders adapted to vertically support the last 54. To one of these lugs is hinged a pressure plate 53 to hold the last in position against the upwardly directed thrust produced during the pressing operation. The last is fitted with the shoe upper 55, the base of which is opposed to an upper face 56 of the platform 41, which face has a contour complementary to that of the lower face of the sole to be vulcanized and united to the shoe upper 55. The face 56 is provided with flutings in accordance with the pattern required to be moulded on the lower face of the rubber sole.

The shaft 14 is provided, at its end projecting outwards from the gear box 15 with a hand wheel 57 for manual operation in emergency.

Further, the parts of the shaft 14 projecting from the two sides of the gear box 15 are fitted with nuts 58 and 59 which can be adjustably fixed by means of lock-nuts 60 and 61. The nuts 58 and 59 are provided at their faces directed towards the front and back ends 62 and 63 of the hub 17 of the worm wheel 16 (Fig. 1) with abutments 64 and 65 respectively. These abutments are adapted to engage respectively abutments 66 and 67 on the hub 17 of the wheel 16 and thereby to initiate rotation of the shaft 14 at the limits of its alternative axial movements.

A source of heat 68 (Fig. 1) which is preferably electrical, is accommodated within the upper part of the platform close under the upper face 56, in order to provide the heat necessary for vulcanization.

The machine so far described operates as follows. It will be assumed that the jaws 3 are open, i. e. in the position shown in Fig. 3. The last 54 fitted with the shoe upper 55 is placed between the jaws and the motor 19 is started. The worm 18 rotates the worm wheel 16.

Owing to the resistance imposed by the platform elevating mechanism to rotation of the screw shaft 14, the hub 17 of the wheel 16, acting as a nut, displaces the shaft 14 axially to the left as viewed in Figs. 1 and 3. This displacement causes a like displacement to the left of the beam 23 and of the two sets of guides 4, jaws 3 and platform 41. Since the guides are fixed to the arms 11, the bridges are rocked to the left. The struts 5 accordingly approach positions perpendicular to the frame 1 and cause jaws 3 to close gradually against the sides of the lower part of the shoe uppers.

When the jaws are completely closed, the shaft 14 reaches the outer limit of its range of axial displacement and engages the abutment 65 on the nut 59 with the abutment 67 on the hub 17 of the worm wheel. The shaft 14 is thereby caused to rotate without axial displacement, and this rotation is transmitted by the shafts 26 and 28 to the gearing in the box 31 producing an advance of the piston 34 and a delivery of liquid into the ram chambers 35. Each piston 39 thereupon rises and urges the associated platform 41, on the face of which has been previously placed an unvulcanized rubber sole, towards the shoe upper 55 placed on the last 54, which supports the molding pressure by bearing against the plate 53.

When this stage is reached, a timing device described below automatically keeps the platforms stationary for the time necessary to effect the vulcanization of the rubber, after which the motor 19 is automatically started in the reverse direction. The above-described sequence of operations now takes place in reversed order. Thus the shaft 14 is axially displaced to the right, the bridges tilt and the jaws 3 open until the abutment 64 on the nut 58 engages the shaft 14 begins to rotate without axial abutment 66 on the hub 17. Thereupon the shaft 14 begins to rotate without axial displacement and causes the piston 34 to be withdrawn. In this way the platforms 41 are caused to descend until they are stopped by the action of a limit switch described below. When the parts of another pair of shoes have been placed in the machine, a new cycle of operation may be started.

When the upper face 56 of the platform 41 is to be electrically heated, which is the usual construction, it may have the form shown in Figs. 9 and 10. This comprises a suitably contoured casting 70 having a hollowed out portion 71. The resistance elements 72 are located close to the top surface and are held in place by a plate 73 in which are provided suitable apertures through which extend the terminals 74 for connecting the resistance elements detachably with a suitable source of current.

The jaws 3 are constructed as shown in Figs. 11 and 12 when electrical heating is employed. Each jaw comprises a hollow casting 75 of the configuration shown having the ends 76 which are slidable in the guide members comprising the casting 4 and the two plates 4'. Resistance elements 77 are located adjacent the interior lateral wall and are maintained in place by the retaining elements 78. The resistance elements are connected to the jacks 79 at the forward and rear ends of the jaws. The jacks 79 are connected to an appropriate source of electrical energy and with the construction described any defective resistance elements may be easily replaced by simply removing the retaining plates 78 and replacing the defective element.

When steam or hot water is to be utilized for the vulcanizing then in such case the jaws 3 and the platform 41 may have a construction such as that shown in Figs. 13 to 18 inclusive. The casting 80 for a jaw 3 has a configuration somewhat similar to that shown in Fig. 11 but in this case inlets 81, and outlets 82 for the water or steam are provided and the interior lateral wall of the jaw is provided with fins 83 for better utilization of the heat at the interior lateral wall. The water or steam compartments 84 are closed at the top by tightly fitting plates 85 secured to the casting 80 by screws 86. A coupling member 87 is threaded into the inlet and outlet apertures 81 and 82 which is connected in turn to a suitable source of steam or water by a flexible connection.

The platform cooperating with the jaws shown in Figs. 13 and 14 is shown in Figs. 15, 16, and 17. The platform 90 comprises a hollow casting 91 provided with fins 92 under its upper surface and the steam or water compartment 93 is closed by a tightly fitting plate 94 secured to the casting 91 by screws 95. The plate 94 is provided with the inlet and outlet openings 96 for steam or water and a coupling member 97 similar to 87 is threaded into such openings for connection to a suitable source of steam or water supply.

In Fig. 6 a last 98 is shown of metal which is hollow and which has extending into the interior a tube 99 with an exterior end 99'. The end 99' may be connected by a flexible connection to a cooling supply such as water so as to prevent any damage to the upper material during vulcanization. A coupling 99'' is also provided in the last 98 which will permit evacuation of the cooling fluid from the last.

The electrical control and wiring

The electrical wiring and control for bringing about the proper sequential operations of the machine described above is shown in Fig. 21.

Various elements and devices shown therein will first be described and then the operation for securing the proper sequential automatic operation will be set forth.

A first clock and timing mechanism is shown at 101 and comprises the relay 102, the mercury switch 103 and the return damping device 104 regulatable by the regulator 105 which controls the entry of air into the device 104 which contains a piston. When the relay 102 is energized the mercury switch 103 is quickly thrown and then the return of the mercury switch 103 to the position shown in Fig. 21 will take place in the period of time for which the regulator 105 may be set. This period is generally about three minutes.

At 106 a similar clock and timing mechanism is shown comprising a relay 102', a mercury switch 103' and elements 104' and 105' corresponding to elements 104 and 105 respectively.

A contact relay is shown at 107 and comprises the coil 108 and the contacts 109. When the coil 108 is energized the contacts 109 will be separated and upon deenergization connection will again be made by the contacts 109.

Another contact relay is shown at 110 and when its coil 111 is energized the contacts 113 will be disconnected and the contacts at 112 will be connected. Upon deenergization of the coil 111 connection will be made by the contacts 113 and disconnection at the contacts 112.

Means for reversing the current to the motor 19 are shown at 114 and 115. The relay 116 operates the element 114 for connecting the motor for direct drive and the relay 117 operates the element 115 for connecting the motor for reverse drive.

A contact relay 118 operated by the coil 119 connects the heating resistances to the current supply.

The fuses 120 safeguard short circuits in the lines connecting the above elements and devices.

A switch 121 controls the current to the electrical control lines and a press button switch 122 initiates the operation of the machine. In order to change at any time the direction of operation of the machine a changeover or reverse switch 123 is provided. In addition a switch 124 is provided for controlling the heating resistances independently.

At the front of the machine the advance switch 125 is located so that when the beam 23 fixed to the guides 4 advances, contact is established between the contacts 126 and 127 momentarily and as the advance continues contact is established between the contacts 128 and 129 which remains during the vulcanizing operation.

A pressure gauge contact is shown at 130 and this gauge is set generally to make contact at 75 atmospheres. It will of course make contact at whatever pressure it is set for. A switch mechanism is also shown at 131 which is operated by the hydraulic pressure gauge shown in Figs. 19 and 20 which is in connection with the ram chambers 35. In the switch mechanism 131 the bridge 132 establishes contact between the contacts 135 and 136 at 20 atmospheres and between 133 and 134 at 25 atmospheres. The bridge 137 maintains contact between the contacts 138 and 139 from zero to 60 atmospheres. When a pressure of 60 atmospheres is exceeded, contact is broken between the contacts 138 and 139 but this contact is again reestablished when the pressure returns to 60 atmospheres.

The return switch 140 is located at the rear of the machine so that upon the return of the beam 23 and the guide 4 the bridge 141 cuts the contact maintained between contact 142 and 143 during the entire vulcanizing period and the bridge 144 establishes contact between the contacts 145 and 146 terminating the operation of the machine.

A red pilot light 147 is lighted upon the termination of the vulcanizing operation to signal the operator that the finished shoes may now be withdrawn.

When the switch 121 is connected a green pilot light 148 is lighted indicating the existence of electric currents in the automatic board.

Th main line switch is indicated at 149 which connects the entire machine to the three-phase main line RST of 220 volts. If the main line is of a different voltage then a transformer is inserted.

The fuses 150 safeguard the main circuit.

The heating resistances for the vulcanization are shown at 151, 152, 153, 154, 155, and 156 and are of 500 watts and 120 volts each and in star connection at the contact point 157. Of the above six resistances four are for the jaws 3, one for each jaw, and the two remaining are for the platforms 41, one for each platform.

A thermostat 158 controls the temperature of the above resistances by making or breaking contact at the contacts 159 and 160. The operation of the thermostat 158 may be brought about by an auxiliary resistance which is in parallel with the ones previously mentioned or by contact with the containers for said resistances.

A red pilot lamp 161 indicates whether current is being supplied or not to the resistances.

The motor 19 is a one horse-power motor operable by a three-phase current of 220 volts between phases.

A series of terminals 209, 210, 211, 212, 213, 214, 215, 216, 217, 218, 219, and 220 is provided whose function will appear below.

The operation is as follows:

The machine is first connected to the main line RST by the switch 149. Then the switch 121 is connected which lights the green pilot lamp 184 indicating that current has been connected to the automatic board.

When it is desired to actually start the operation of the machine the starting button 122 is pressed and then the following circuit is established: from phase T of the main line, to the terminal 212, to switch 121, to terminal 220, to the coil 111 actuating the relay 110, then to the terminals 211, 210 and 209 to the other phase S of the main line. When the relay 110 is actuated the contacts 112 are connected and the current then coming from the terminal 220 passes over the contacts 112 and energizes the coil 116 since the circuit is again closed by passing through the terminals 211, 210 and 209 to the phase S of the main line. When the coil 116 is energized it connects the contact 114 and the main line three-phase current RST passes over 114 to W, U, V and to the motor 19.

When the push button 122 is released the current does not reach the coils 111 and 116 over the terminal 220 but instead it comes from the switch 121 through the terminal 216 and the contacts 109 to the contact 114 at its fourth bridge which has been raised previously and therefore the relays 110 and 116 continue in operation and the motor 19 is set in direct drive actuating the worm 18, the worm wheel 16 thereby moving the shaft 14 axially which brings about a closing of the jaws 3 on their forward movement.

During this forward movement of the jaws 3 the rear end of the return switch 140 disconnects the contacts 145 and 146 thereby extinguishing the red pilot light 147 which indicates the end of the vulcanizing period. Contact is simultaneously made with the contacts 142 and 143. When the locking movement of the jaws 3 terminates the forward end of the advance switch 125 is actuated thereby producing a momentary contact between the contacts 126 and 127 so that the current coming from the switch 121, to the terminal 216, contacts 109, fourth bridge of 114, terminal 220, passes from 127 to 126, to the terminal 214 thereby energizing the coil 102 of the first timing mechanism 101 as well as the coil 102' of the second timing mechanism which is in parallel, and then the circuit is closed through the terminals 211, 210 and 209 to the line S. At this moment the timing devices of 101 and 106 are set so that 101 will operate in about three minutes and 106 will operate in about twelve minutes. The contact between 126 and 127 is only momentary and afterwards toward the end of the advance movement of the jaws, contact is established and remains established between the contacts 128 and 129.

As explained above when the jaws 3 are completely closed the shaft 14 no longer has any axial movement but rotates in order to bring about the hydraulic compression of the coil in the cylinders 35.

Connected to the cylinders 35 is a small cylinder which acts as a pressure gauge. This gauge is shown in Figs. 19 and 20.

When the unvulcanized rubber is pressed against the upper it is advantageous to maintain the pressure at about 25 atmospheres during the first three minutes in order to prevulcanize the rubber at the closure point and thereby avoid the losses which would be produced by a greater pressure. As soon as this prevulcanization has been carried out then the pressure is raised to about 75 atmospheres and such pressure is maintained throughout the remainder of the process. These operations are taken care of automatically by the pressure gauge cooperating with a switch arrangement.

The hydraulic pressure gauge shown in Figs. 19 and 20 comprises a small cylinder 316 which is connected with the ram chambers 35. When such chambers are subjected to pressure it will raise a small piston 318 against the pressure exerted by a spring 319. The piston 318 is extended by a rod 320 which controls the switches 131, so as to suitably actuate the motor 19. The piston 318 slides in a bore 317 provided in the cylinder 316 and the spring 319 is enclosed in a cylindrical tube 315 which is closed at the top by a plug 321. By suitably adjusting the plug 321 the pressure gauge may be adjusted so as to act at various pressures.

During the initial period of three minutes the switches at 131 disconnect the motor when the pressure reaches 25 atmospheres and then sets the motor 19 in operation again at 20 atmospheres if any losses should occur thereby keeping the pressure between these limits.

After the initial period of three minutes which takes care of the prevulcanization mentioned above the switches 131 are inoperative and the motor 19 is controlled by other means to increase the pressure until the contact gauge 130 comes into operation and cuts the current for the motor 19 at 75 atmospheres. If there is a pressure loss the motor 19 is again started when the pressure drops to 65 atmospheres and in this way the pressure is maintained between 65 and 75 atmospheres until vulcanization is completed when the entire pressure is released.

The switch system shown at 131 operates as follows under the action of the extension 320. When the bridge 132 closes the contact between the contacts 133 and 134 the circuit through the terminal 216 passes through the mercury switch 103 which has been set so that the central contact therein connects with the contact at the right hand side, then to the terminal 218, contacts 133 and 134, the terminal 217, then to the coil 108 energizing the same and finally through the terminals 211, 210 and 209 back to the line S.

When the coil 108 of the relay 107 is energized the contacts 109 are disconnected thereby deenergizing the coil 111 and the coil 116 of the device 114. This breaks the main line connection to the motor 19 and stops the motor. This takes place at 25 atmospheres.

If there should be a loss of hydraulic pressure then the bridge 132 of the switch 131 will descend and make contact between the contacts 135 and 136. In such case the following circuit would be established: from switch 121 to the terminal 216, to the mercury switch 103 which is set to connect the central and right hand contacts, then to the terminal 218, then to the contacts 136 and 135 then to the terminal 220 again energizing the relay 110 and the device 114 as previously described with reference to operating the press button 122 whereby a momentary circuit was established through the terminal 220. The motor 19 is then restarted temporarily since the bridge 132 again connects 133 and 134 at which position as previously explained the motor circuit was broken.

In the above manner the pressure is maintained between 25 and 20 atmospheres by the bridge 132 first making contact between the contacts 133 and 134 and then between 135 and 136. This only takes place during the time that the mercury switch 103 has been set so as to make contact between the central and the right hand terminal which as above explained continues for a period of about three minutes as set by the regulator 105.

After the three minute period the mercury switch is returned to the position shown in Fig. 21 and the central contact connects the terminal at the left hand side and then the following circuit is established: from the switch 121 to the terminal 216 thence to the central and left hand terminals of the mercury switch 103 then to the terminal 213, then to the contacts 129 and 128, since at the termination of the movement of the jaws towards one another contact became established between 129 and 128, then to the terminal 215, then to the central terminal of the mercury switch 103' then to the right hand terminal of the mercury switch 103' since as above explained this mercury switch remains in action for approximately 12 minutes, then to the terminal 219, then to the contacts 139 and 138 which are connected by the bridge 137, then to the terminal 220 and then in the same manner as previously explained when the press button 122 is operated from terminal 220 to the coil 111 of the relay 110 energizing the same, then through contacts 112 to the coil 116 energizing the same and then by way of the terminals 211, 210 and 209 to the line S. The motor 19 therefore is started again within three minutes from the beginning of the operation independently of the position of the bridge 132 of the switch arrangement 131.

Therefore the motor 19 continues in operation and the current operating the same is not cut off at 25 atmospheres since the bridge 132 connecting the contacts 133 and 134 has no effect because the circuit formerly coming through the terminal 218 and the right hand terminal and central terminal of the mercury switch 103 is broken. The motor 19 therefore continues in operation to increase the hydraulic pressure in the ram chambers until the bridge 137 breaks the connection between the contacts 138 and 139 at 60 atmospheres. The motor 19 continues in operation after the breaking of such connection since the coils 111 and 116 are still energized not through the terminal 220 and the bridge 137 which has been broken but as previously explained through the following circuit; from switch 121, terminal 216, contacts 109 and the fourth bridge of the device 114, with a consequent energization of the coils 111 and 116.

The motor 19 therefore continues in operation even after the circuit has been broken at the bridge 137 at 60 atmospheres and the motor continues in operation until the contact gauge 130 breaks the circuit at the pressure for which it has been set which is about 75 atmospheres. At such moment the circuit from switch 121 passes over the contact gauge 130 to the terminal 217, to the coil 108 and through the terminals 210 and 209 to the line S. In energizing the coil 108 the contacts 109 are broken and since the coils 111 and 116 were fed through the 4th bridge of the device 114 and the contacts 109, the circuit to the motor 19 is broken.

If there is a drop in pressure in the ram chambers 35 the bridge 137 under the action of the extension 320 will be lowered and make contact again between the contacts 138 and 139. In such case the motor 19 will again be in circuit as previously explained through the terminal 219 and the central and right hand terminals of the mercury switch 103' since the central terminal of mercury switch 103' has not yet been connected with the left hand terminal.

Therefore after the initial first three minutes even if losses in pressure should occur the pressure is maintained constant between 60 and 75 atmospheres to the end of the vulcanization period which is calculated to be about 12 minutes from the start.

The reason for carrying out the vulcanization at a low pressure during the initial stage is to bring about a closure of the joints between the upper and the sole and then after such closure has been established to supply the maximum pressure during the remainder of the operation.

After the twelve minute stage the central terminal of mercury switch 103' makes contact with its left hand terminal as shown in Fig. 21 and the circuit is established as follows: From the switch 121 to the terminal 216, through the central and left hand terminal of 103, to terminal 213 through contacts 129 and 128, to terminal 215, through the central and left hand terminals of mercury switch 103', then to the coil 117 of the device 115 then through contacts 113, then through the small bridge of device 114 then to the terminal 302, then through contacts 143 and 142 through the bridge 141 since at the beginning of the closing of the jaws 3 this contact was established, then to the terminal 301 and thence to the line S.

When the coil 117 of the circuit above described is energized the device 115 is actuated and the three-phase line RST is connected to the lines WVU and the motor 19 is rotated in opposite direction thereby initiating the return movement. The hydraulic pressure is removed and the jaws 3 open as explained above. In such case the switch 125 removes the connection between 128 and 129 and comes to the position occupied when the jaws 3 are being opened. However, such movement of the beam 23 and the guide 4 causes at the rear of the machine a connection between the contacts 145 and 146 by the bridge 144. In such case current from the switch 121 lights the lamp 147, passes through the bridge 144 to the terminal 301 which is connected to the line S. The lighting of the red lamp 147 indicates the end of the vulcanizing operation. Finally the return circuit described above is broken when the bridge 141 in the final stage of the movement of the jaws 3 breaks the connection between the contacts 142 and 143 and the operation is finished.

If at any time during the operation of the machine it is necessary to reverse the direction of rotation of the motor 19 it is merely necessary to operate the switch 123 which breaks the connection between the terminals 210 and 209 which is essential for the direct operation of the motor and in such case current from switch 121 passes over the switch 123 to the terminal 211 from which it passes to the coil 117 which is energized and actuates the device 115 which drives the motor 19 in opposite direction.

In order to secure the heating of the jaws 3 and the platform 141 the heating switch 124 is closed and a circuit is established as follows: from the switch 124 to the contacts 160 and 159 of the thermostat 158. If such thermostat is cold then the current passes to the coil 119 which makes the necessary connection with the main line. Energization of the coil 119 connects the lines RST to the terminals 308, 307, and 306 and thence to the resistances. Simultaneously the circuit at 160 flows to the signal lamp 161 which is lighted and indicates that the circuit is closed through the terminal 301 and the line S.

When the resistances have reached the desired temperature the thermostat 158 breaks the connection between the contacts 160 and 159 and this brings about a deenergization of the coil 119 which breaks the connection of the resistances to the main line as well as the circuit of the light 161. When the thermostat has cooled sufficiently it again connects the contacts 159 and 160 and in this way a predetermined constant temperature is maintained by the resistances.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:

1. An automatic vulcanizing machine comprising a last upon which a shoe to which a sole is to be vulcanized is mounted, a frame, a bridge pivotally mounted in the lower portion of said frame, guide members fixed to said bridge, means for reciprocating said guide members, lateral compression elements slidably mounted in said guide members, said compression elements being pivotally connected to said frame so that upon reciprocation of said guide members said compression members will be reciprocated in a direction at right angles to the reciprocation of said guide members and a ram for compressing the rubber against said sole when said compression elements have moved to their compression position.

2. An automatic vulcanizing machine comprising a last upon which a shoe to which a sole is to be vulcanized is mounted, a frame, a bridge pivotally mounted in the lower portion of said frame, guide members fixed to said bridge, means for reciprocating said guide members, lateral compression elements slidably mounted in said guide members, said compression elements being pivotally connected to said frame so that upon reciprocation of said guide members said compression members will be reciprocated in a direction at right angles to the reciprocation of said guide members, said guide members upon reciprocation oscillating said bridge and a ram for compressing the rubber against said sole when said compression elements have moved to their compression position.

3. An automatic vulcanizing machine comprising a last upon which a shoe to which a sole is to be vulcanized is mounted, a frame, a bridge pivotally mounted in the lower portion of said frame, guide members fixed to said bridge, means for reciprocating said guide members, lateral compression elements slidably mounted in said guide members, said compression elements being pivotally connected to said frame so that upon reciprocation of said guide members said compression members will be reciprocated in a direction at right angles to the reciprocation of said guide members, said guide members oscillating said bridge upon their reciprocation, a ram for compressing the rubber against said sole when said compression elements have moved to their compression position and means for operating said ram controlled by said reciprocating means for said guide members.

4. An automatic vulcanizing machine comprising a last upon which a shoe to which a sole is to be vulcanized is mounted, a frame, a bridge pivotally mounted in the lower portion of said frame, guide members fixed to said bridge, means for reciprocating said guide members, lateral compression elements slidably mounted in said guide members, said compression elements being pivotally connected to said frame so that upon reciprocation of said guide members said compression members will be reciprocated in a direction at right angles to the reciprocation of said guide members, a ram elevating mechanism for said ram and means for actuating said elevating mechanism when said compression elements have reached their compression position.

5. An automatic vulcanizing machine comprising a last upon which a shoe to which a sole is to be vulcanized is mounted, a frame, a bridge pivotally mounted in the lower portion of said frame, guide members fixed to said bridge, means for reciprocating said guide members, lateral compression elements slidably mounted in said guide members, said compression elements being pivotally connected to said frame so that upon reciprocation of said guide members said compression members will be reciprocated in a direction at right angles to the reciprocation of said guide members and a control motor for operating said reciprocating means for said guide members.

6. In an automatic shoe machine for vulcanizing a sole to an upper, a last supported in said machine upon which the upper of a shoe is placed, means for oscillating said last about a fixed point, lateral compression elements oscillated with said last, means for reciprocating said compression elements at right angles to the oscillation of said last, a ram for compressing unvulcanized rubber against said last, means for holding said last in position against pressure of unvulcanized rubber, and means for first moving said compression element towards said last and then said ram toward said last.

7. In an automatic vulcanizing machine comprising a last supported in said machine upon which a shoe to which a sole is to be vulcanized is mounted, a frame, a bridge pivotally mounted in the lower portion of said frame, guide members fixed to said bridge, means for oscillating said guide members, lateral compression elements slidably mounted in said guide members, said compression elements being pivotally connected to said frame so that upon oscillation of said guide members said compression members will be reciprocated in a direction at right angles to the oscillation of said guide members, a ram for compressing unvulcanized rubber against said sole when said compression elements have moved to their compression position and means for holding said last in position against pressure of unvulcanized rubber.

8. In an automatic vulcanizing machine, a last supported in said machine upon which a shoe to which a sole is to be vulcanized is mounted, a frame, a bridge pivotally mounted in the lower portion of said frame, guide members fixed to said bridge, means for oscillating said guide members, lateral compression elements slidably mounted in said guide members, said compression elements being pivotally connected to said frame so that upon oscillation of said guide members said compression members will be reciprocated in a direction at right angles to the oscillation of said guide members, said guide members upon oscillation oscillating said bridge and a ram for compressing the rubber against said sole operable by the movement of said bridge, and means for holding said last in position against pressure of unvulcanized rubber.

9. In an automatic shoe machine for vulcanizing a sole to an upper, a last supported in said machine upon which the upper of a shoe is placed, means for oscillating said last about a fixed point, lateral compression elements oscillated with said last, means for reciprocating said compression elements at right angles to the oscillation of said last, a ram for compressing unvulcanized rubber against said last, means for holding said last in position against pressure of unvulcanized rubber, means for moving said compression elements toward said last, means for then moving said ram toward said last under pressure and then after a predetermined period under a higher pressure.

10. In an automatic shoe machine for vulcanizing a sole to an upper, a last supported in said machine upon which the upper of a shoe is placed, means for oscillating said last about a fixed point, lateral compression elements oscillated with said last, means for reciprocating said compression elements at right angles to the oscillation of said last, a ram for compressing unvulcanized rubber against said last, means for holding said last in position against pressure of unvulcanized rubber, means for moving said compression elements toward said last, means for then moving said ram toward said last under pressure, then after a predetermined period under a higher pressure and means for heating said ram and compression elements.

11. A machine for uniting by vulcanization a rubber sole to an upper of a boot or shoe, characterized in that the machine includes a rigid frame, a rockable bridge comprising a head having on its under side means for the attachment of a last in an upright position, the bridge also comprising two depending arms pivotally connected at their lower ends to said frame, guides rigidly mounted on said bridge and supporting a pair of jaws which are adapted to shape the two side edges of the sole and which are slidable towards and away from each other in a direction perpendicular to the direction of rocking movement of the bridge, means cooperating with the jaws and the frame to urge the jaws together in response to rocking movement of the bridge, a platform which is adapted to shape the under side of the sole, the platform being provided with heating means and connected to an elevating device mounted in the frame, and actuating means to displace the bridge so as to close the jaws and to operate the elevating device so as to raise the platform into position to compress the sole against the last.

12. A machine as claimed in claim 11, wherein the said means for urging the jaws together are constituted by struts each pivotally connected to one of the jaws and to the frame.

GONZALO MEDIANO CAPDEVILA.

References Cited in the file of this patent

UNITED STATES PATENTS

| Number | Name | Date |
|---|---|---|
| 574,239 | Butterfield | Dec. 29, 1896 |
| 1,085,296 | Perkins | Jan. 27, 1914 |
| 1,770,655 | Nielsen | July 15, 1930 |
| 1,989,853 | Finn | Feb. 5, 1935 |
| 1,994,278 | Halsall et al. | Mar. 12, 1935 |
| 2,313,623 | Bungay | Mar. 9, 1943 |

FOREIGN PATENTS

| Number | Country | Date |
|---|---|---|
| 617,211 | Great Britain | Feb. 2, 1949 |